(12) United States Patent
Kwon et al.

(10) Patent No.: US 9,871,576 B2
(45) Date of Patent: Jan. 16, 2018

(54) INTERFERENCE CANCELLATION REPEATER

(71) Applicant: SOLiD, INC., Seongnam-si, Gyeonggi-do (KR)

(72) Inventors: Nagwon Kwon, Seoul (KR); Hyunchae Kim, Seoul (KR)

(73) Assignee: SOLiD, INC., Seongnam-si (KR)

( * ) Notice: Subject to any disclaimer, the term of this patent is extended or adjusted under 35 U.S.C. 154(b) by 0 days.

(21) Appl. No.: 15/391,180

(22) Filed: Dec. 27, 2016

(65) Prior Publication Data

US 2017/0187448 A1    Jun. 29, 2017

(30) Foreign Application Priority Data

Dec. 28, 2015   (KR) ........................ 10-2015-0187890

(51) Int. Cl.
*H04B 3/36* (2006.01)
*H04B 7/155* (2006.01)

(52) U.S. Cl.
CPC ................................ *H04B 7/15585* (2013.01)

(58) Field of Classification Search
CPC ............ H04B 7/15585; H04B 7/15564; H04B 15/00; H04B 17/345; H04B 1/7107; H04L 25/0202; H04J 11/0036; H04J 11/004

USPC ............ 370/274, 246; 455/11.1, 63.1, 67.11, 455/296; 375/211, 346, 260, 347, 349, 375/350
See application file for complete search history.

(56) References Cited

U.S. PATENT DOCUMENTS

2011/0170473 A1*   7/2011   Proctor, Jr. ........ H04B 7/15585
                                                            370/315

\* cited by examiner

*Primary Examiner* — Rahel Guarino
(74) *Attorney, Agent, or Firm* — Sughrue Mion, PLLC

(57) ABSTRACT

An interference cancellation repeater configured to cancel an interference signal included in an input signal, the interference cancellation repeater including: a canceller configured to generate an interference canceled signal based on the input signal and an estimated signal; a digital filter configured to filter the interference canceled signal to generate an output signal; an interference signal detector configured to generate interference signal existence interval information using the input signal and the output signal; and an adaptive filter configured to receive the interference canceled signal and the output signal, and generate the estimated signal based on the interference signal existence interval information. Information of the signal existence section.

11 Claims, 3 Drawing Sheets

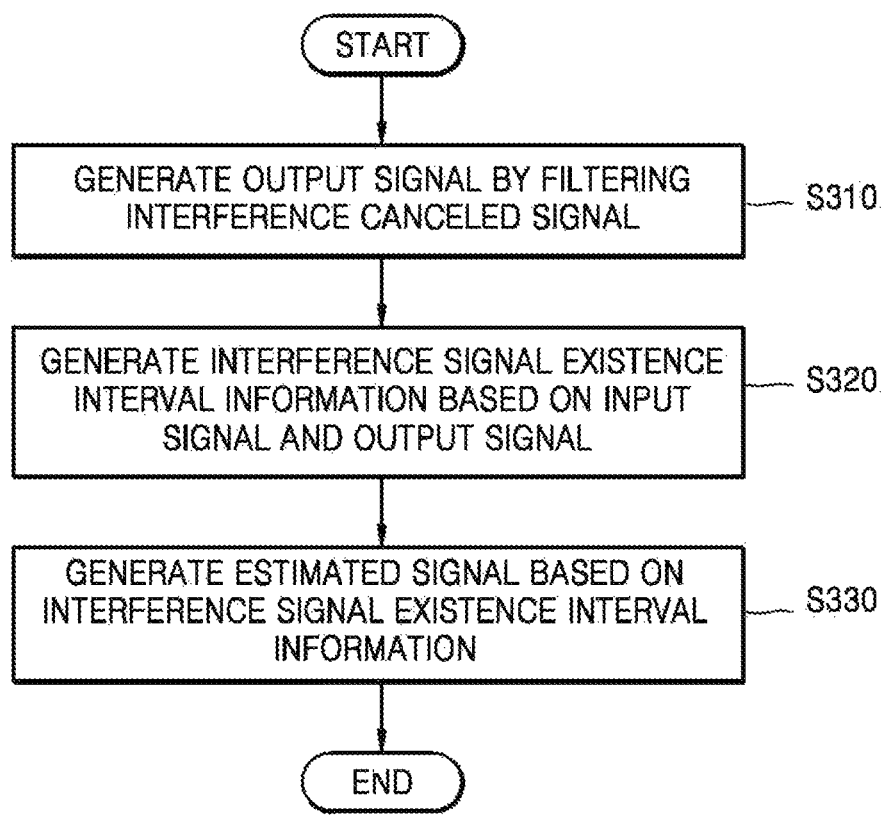

INTERFERENCE CANCELLATION REPEATER

CROSS-REFERENCE TO RELATED APPLICATION

This application claims the benefit of Korean Patent Application No. 10-2015-0187890, filed on Dec. 28, 2015, in the Korean Intellectual Property Office, the disclosure of which is incorporated herein in its entirety by reference.

BACKGROUND

1. Field

The inventive concept relates to an interference cancellation repeater.

2. Description of the Related Art

Since a common wireless repeater uses an identical frequency at its input terminal and output terminal, an output signal may be input to the wireless repeater again when an input terminal antenna and an output terminal antenna are not sufficiently isolated from each other, and a multi-path signal generated by reflecting the output signal by an obstacle or a moving object may be input to the wireless repeater again.

If the output signal is input to the wireless repeater again through a feedback channel as an interference signal, a signal quality may deteriorate or the system may oscillate. Therefore, the wireless repeater is required to pre-process and repeat only an original input signal from which the interference signal has been canceled.

Therefore, an interference cancellation repeater has been used which cancels a reflection interference signal and processes only an original input signal for output.

SUMMARY

The inventive concept is directed to an interference cancellation repeater improving interference signal cancellation performance, reducing noise generation, and minimizing power consumption.

Additional aspects will be set forth in part in the description which follows and, in part, will be apparent from the description, or may be learned by practice of the presented embodiments.

According to an aspect of the inventive concept, there is provided an interference cancellation repeater configured to cancel an interference signal included in an input signal, the interference cancellation repeater includes: a canceller configured to generate an interference canceled signal based on the input signal and an estimated signal; a digital filter configured to filter the interference canceled signal to generate an output signal; an interference signal detector configured to generate interference signal existence interval information using the input signal and the output signal; and an adaptive filter configured to receive the interference canceled signal and the output signal, and generate the estimated signal based on the interference signal existence interval information.

According to an exemplary embodiment, wherein the interference signal detector may be configured to calculate a correlation between the input signal and the output signal, and generate the interference signal existence interval information according to the calculation result.

According to an exemplary embodiment, wherein the adaptive filter may include: a filter controller configured to control a filter coefficient for generating the estimated signal based on the interference signal existence interval information; and an estimated signal generator configured to generate the estimated signal based on the filter coefficient.

According to an exemplary embodiment, wherein the interference signal existence interval information may include information about a time interval or a frequency interval in which the interference signal exists in the input signal.

According to an exemplary embodiment, wherein the filter controller may be configured to control the filter coefficient so as to generate the estimated signal in an interval in which the interference signal exists.

According to an exemplary embodiment, the interference cancellation repeater may further include a delay unit configured to delay an input of the output signal to the adaptive filter until the filter coefficient is generated when the filter controller controls the filter coefficient to generate the estimated signal.

According to an exemplary embodiment, wherein the filter controller may be configured to control the filter coefficient so as not to generate the estimated signal in an interval in which the interference signal exists.

According to an exemplary embodiment, wherein the estimated signal may be a signal estimated to correspond to the interference signal included in the input signal.

According to another aspect of the inventive concept, there is provided an interference cancellation repeater configured to cancel an interference signal included in an input signal, the interference cancellation repeater includes: a canceller configured to generate an interference canceled signal based on the input signal and an estimated signal; a digital filter configured to filter the interference canceled signal to generate an output signal; an interference signal detector configured to detect an interval in which the interference signal exists in the input signal based on the input signal and the output signal; and an adaptive filter configured to generate the estimated signal based on the interference canceled signal and the output signal in the detected interval.

According to an exemplary embodiment, wherein the interference signal detector may be configured to calculate a correlation between the input signal and the output signal, and detect a time interval or a frequency interval in which the interference signal exists in the input signal according to the calculation result.

According to an exemplary embodiment, wherein the adaptive filter may be configured to not generate the estimated signal in an interval in which the interference signal does not exist in the input signal.

According to the inventive concept, interference cancellation performance may be improved and generation of an unnecessary estimated signal may be prevented. Therefore, noise generated in an interference cancellation repeater may be reduced and power consumption may be minimized.

BRIEF DESCRIPTION OF THE DRAWINGS

These and/or other aspects will become apparent and more readily appreciated from the following description of the embodiments, taken in conjunction with the accompanying drawings in which:

FIG. 3 is a flowchart of a method of canceling an interference signal according to an example embodiment of the inventive concept.

DETAILED DESCRIPTION

Figure 1:
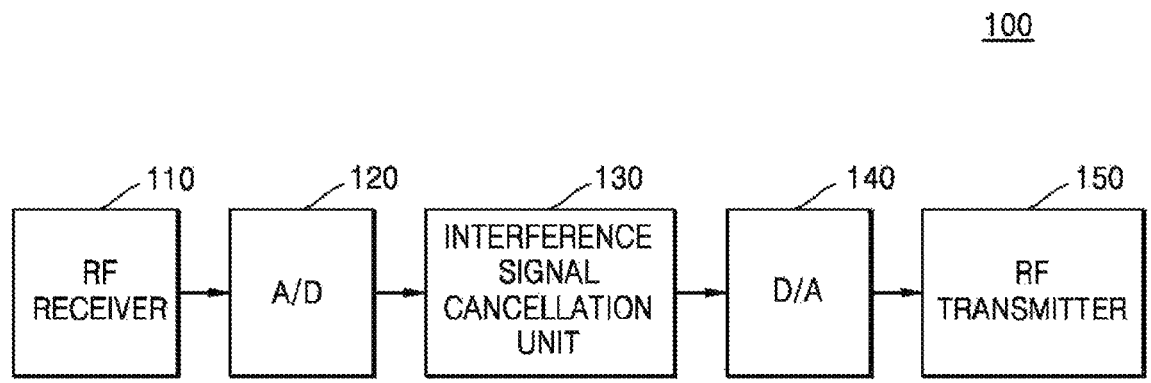
FIG. 1 is a block diagram of an interference cancellation repeater according to an example embodiment of the inventive concept.

The inventive concept may be variously modified and have various example embodiments, so that specific example embodiments will be illustrated in the drawings and described in the detailed description. However, this does not limit the inventive concept to specific example embodiments, and it should be understood that the inventive concept covers all the modifications, equivalents and replacements included within the idea and technical scope of the inventive concept.

In describing the inventive concept, in the following description, a detailed explanation of known related technologies may be omitted to avoid unnecessarily obscuring the subject matter of the inventive concept. In addition, numeral figures (for example, 1, 2, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms including "unit", "er", "or", "module", and the like disclosed in the specification mean a unit that processes at least one function or operation and this may be implemented by hardware or software such as a processor, a micro processor, a micro controller, a central processing unit (central processing unit), a graphics processing unit (GPU), an accelerated Processing unit (APU), a digital signal processor (DSP), an application specific integrated circuit (ASIC), and a field programmable gate array (FPGA) or a combination of hardware and software.

Moreover, it is intended to clarify that components in the specification are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

Hereinafter, example embodiments of the inventive concept will be described in detail.

FIG. 1 is a block diagram of an interference cancellation repeater 100 according to an example embodiment of the inventive concept.

Referring to FIG. 1, the interference cancellation repeater 100 according to an example embodiment of the inventive concept may repeat communication between a base station and a terminal.

The interference cancellation repeater 100 may include a radio frequency (RF) receiver 110, an analog-to-digital (A/D) converter 120, an interference signal cancellation unit 130, a digital-to-analog (D/A) converter 140, and an RF transmitter 150.

Describing a downlink path as an example, the RF receiver 110 may receive an RF signal from a base station. Furthermore, the RF receiver 110 may receive all or some of an output signal (for example, a repeat signal) transmitted from the RF transmitter 150 in addition to the RF signal. The output signal transmitted from the RF transmitter 150 in addition to the RF signal may function as an interference signal to the RF signal.

The analog-to-digital converter 120 may convert the RF signal to a digital signal.

The interference signal cancellation unit 130 may cancel an interference signal included in the digital signal. For example, the interference signal cancellation unit 130 may generate an inverse-phase estimated signal corresponding to the interference signal included in the digital signal using a plurality of adaptive filters and may add the generated estimated signal to the digital signal to cancel the interference signal.

The digital-to-analog converter 140 may convert the digital signal from which the interference signal has been canceled to an analog signal, that is, an original RF signal.

The RF transmitter 150 may transmit the RF signal to the outside after processing such as amplification. For example, the RF transmitter 150 may transmit the amplified RF signal to a terminal.

As described above, the interference cancellation repeater 100 according to an example embodiment of the inventive concept may generate an estimated signal only during a period in which an interference signal is generated in the interference signal cancellation unit 130, that is, during a time interval or a frequency interval during which the interference signal is input, and may cancel an interference signal included in the input RF signal. A specific operation of the interference signal cancellation unit 130 will be described in detail later below with reference to FIG. 2.

Figure 2:
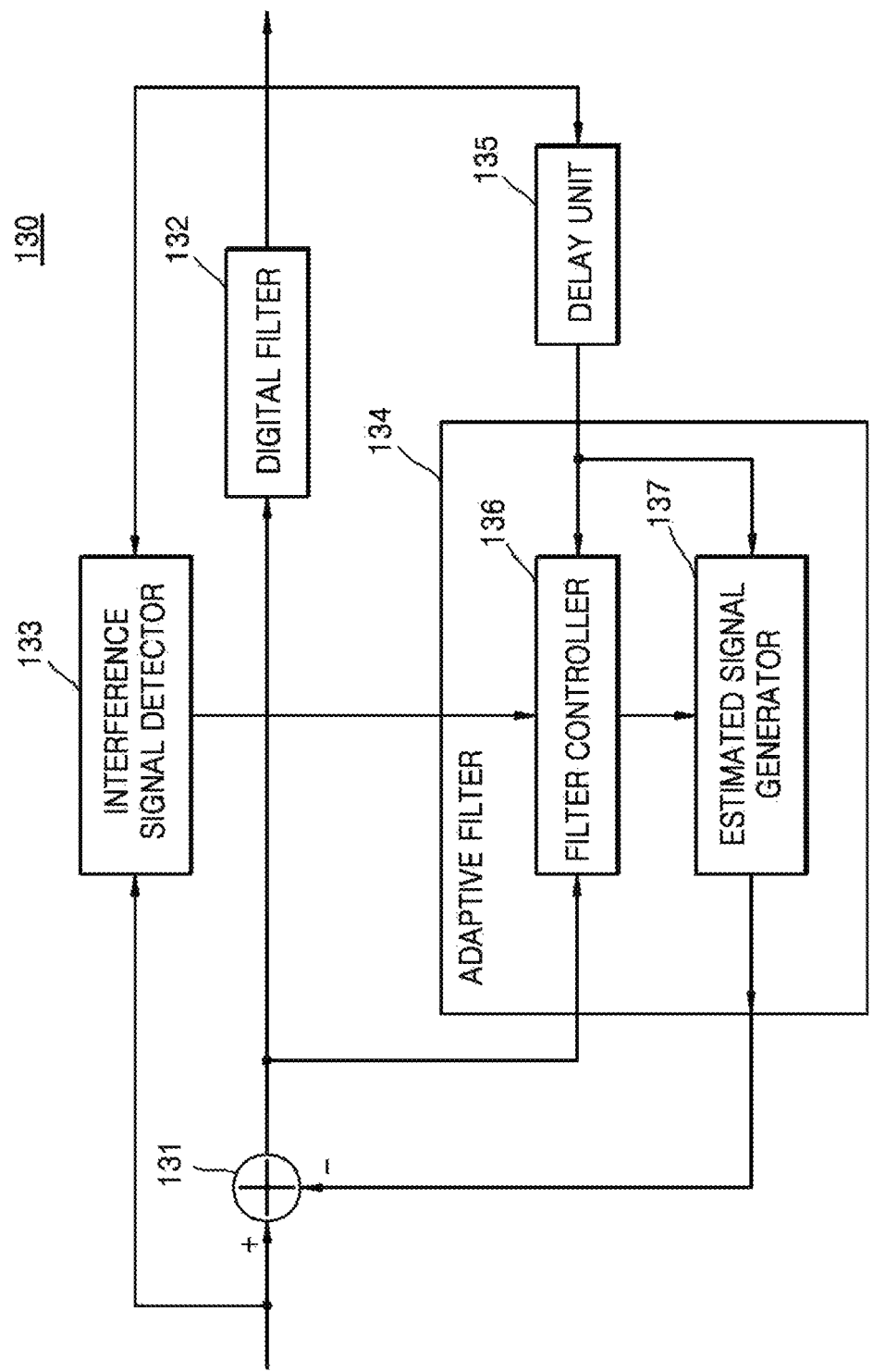
FIG. 2 is a block diagram of an interference signal cancellation unit according to an example embodiment of the inventive concept.

FIG. 2 is a block diagram of an interference signal cancellation unit 130 according to an example embodiment of the inventive concept.

Referring to FIG. 2, the interference signal cancellation unit 130 according to an example embodiment of the inventive concept may include a canceller 131, a digital filter 132, an interference signal detector 133, an adaptive filter 134, and a delay unit 135.

The canceller 131 may generate an interference canceled signal by combining an input signal and an estimated signal. For example, the input signal may refer to a signal transmitted from the analog-to-digital converter 120 (see FIG. 1). Furthermore, it is assumed that the input signal includes an RF signal transmitted from a base station and an interference signal input to the RF receiver 110 (see FIG. 1) through a feedback channel. Here, the canceller 131 may generate the interference canceled signal by combining the input signal and the estimated signal corresponding to the interference signal and having a reverse phase.

The digital filter 132 may filter the interference canceled signal transmitted from the canceller 131 to generate an output signal. Here, the filtering may be understood as a process of digital signal processing, for example, a signal processing process for canceling at least one frequency band outside a specific frequency band for transmission to the terminal from the interference canceled signal.

The output signal of the digital filter 132 may be transmitted to the interference signal detector 133 and the adaptive filter 134. In one aspect, it can be understood that the output signal of the digital filter 132 is fed back to the interference signal detector 133 and the adaptive filter 134.

The interference signal detector 133 may generate interference signal existence interval information related to an interval in which an interference signal exists in the input signal, based on the input signal and the output signal. For example, the interference signal detector 133 may calculate a correlation between the input signal and the output signal in a frequency domain or a time domain, and may generate the interference signal existence interval information according to the calculation result. However, the inventive concept is not limited thereto, and the interference signal detector 133 may generate interference signal existence interval information related to the interval in which an interference signal exists in various ways such as probability distribution-based estimation and the like.

Meanwhile, according to an example embodiment, the interference signal existence interval information may be information indicating an interval in which the interference signal does not exist in the input signal. In this case, the interference signal detector 133 may also generate the interference signal existence interval information by detecting a time interval or a frequency interval in which the interference signal does not exist in various ways such as correlation-based estimation, probability distribution-based estimation, or the like. Hereinafter, for convenience of explanation, it is assumed that the interference signal existence interval information is information indicating an interval in which the interference signal exists in the input signal.

The interfering signal detector 133 may transmit the interference signal existence interval information to the adaptive filter 134.

The adaptive filter 134 may generate an estimated signal for canceling the interference signal from the input signal based on the interference signal existence interval information.

The adaptive filter 134 may include a filter controller 136 and an estimated signal generator 137.

The filter controller 136 may control a filter coefficient for generating the estimated signal based on the interference signal existence interval information. For example, the filter controller 136 may set the filter coefficient to generate the estimated signal in the interval in which the interference signal exists, according to the interference signal existence interval information. The filter controller 136 may set the filter coefficient (for example, mask the filter coefficient) so as not to generate the estimated signal in an interval in which the interference signal does not exist, according to the interference signal existence interval information.

When the estimated signal is generated in the interval in which the interference signal exists, the filter controller 136 may recognize a waveform of an interference signal to be input subsequently based on the output signal transmitted from the digital filter 132 through the delay unit 135 and/or the first interference canceled signal transmitted from the canceller 131, and may control the filter coefficient to generate an estimated signal for canceling the interference signal to be input subsequently.

The estimated signal generator 137 may generate an estimated signal under the control of the filter controller 136. For example, the estimated signal generator 137 may generate the estimated signal using the output signal with a filter coefficient set by the filter controller 136.

The delay unit 135 may delay an input of the output signal to the adaptive filter 134. For example, when the filter controller 136 updates a filter coefficient to generate an estimated signal in a time interval in which an interference signal exists, the delay unit 135 may delay an input of the output signal to the adaptive filter 134 until the filter coefficient is generated.

As described above, the interference signal cancellation unit 130 according to an example embodiment of the invention concept may detect whether an interference signal exists, may generate an estimated signal only in an interval in which an interference signal exists, and may cancel an interference signal included in an input signal using the estimated signal.

Therefore, it is possible to prevent generation of an unnecessary estimated signal, thereby minimizing noise generation in the interference canceller 100 (see FIG. 1) and preventing unnecessary power consumption.

FIG. 3 is a flowchart of a method of canceling an interference signal according to an example embodiment of the inventive concept. In some example embodiments, it should be noted that each of operations shown in FIG. 3 may be performed out of the order shown. For example, successively illustrated operations may be performed substantially concurrently or in a reverse order. The method of canceling an interference signal of FIG. 3 may be performed by the interference cancellation unit 130 described with reference to FIGS. 1 and 2. Hereinafter, a case where the method of canceling an interference signal is performed by the interference cancellation unit 130 will be described as an example.

Referring to FIG. 3, in operation S310, the digital filter 132 may generate an output signal by filtering an interference canceled signal transmitted from the canceller 131. The output signal of the digital filter 132 may be fed back to the interference signal detector 133 and the adaptive filter 134.

In operation S320, the interference signal detector 133 may generate interference signal existence interval information based on an input signal and the output signal. For example, the interference signal detector 133 may calculate a correlation between the input signal and the output signal to detect an interval in which the interference signal exists in the input signal, and may generate the interference signal existence interval information related to the detected interval.

In operation S330, the adaptive filter 134 may generate an estimated signal for canceling the interference signal from the input signal based on the interference signal existence interval information.

For example, the adaptive filter 134 may control a filter coefficient for generating an estimated signal based on the interference signal existence interval information. In more detail, the adaptive filter 134 may set a filter coefficient such that an estimated signal is generated in an interval in which an interference signal exists, and may set a filter coefficient (for example, mask a filter coefficient) such that the estimated signal is not generated in an interval in which an interference signal does not exist.

When an estimated signal is generated in an interval in which an interference signal exists, the adaptive filter 134 may recognize a waveform of an interference signal to be input subsequently based on the interference canceled signal and the output signal, and may control a filter coefficient to generate an estimated signal for canceling the interference signal to be input subsequently.

The adaptive filter 134 may generate the estimated signal using the output signal with the controlled filter coefficient.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. An interference cancellation repeater configured to cancel an interference signal included in an input signal, the interference cancellation repeater comprising at least one memory and at least one processor to implement:
    a canceller configured to generate an interference canceled signal based on the input signal and an estimated signal;
    a digital filter configured to filter the interference canceled signal to generate an output signal;
    an interference signal detector configured to generate interference signal existence interval information using the input signal and the output signal; and
    an adaptive filter configured to receive the interference canceled signal and the output signal, and generate the estimated signal based on the interference signal existence interval information.

2. The interference cancellation repeater of claim 1, wherein
    the interference signal detector is configured to calculate a correlation between the input signal and the output signal, and generate the interference signal existence interval information according to the calculated correlation.

3. The interference cancellation repeater of claim 1, wherein the adaptive filter comprises:
    a filter controller configured to control a filter coefficient for generating the estimated signal based on the interference signal existence interval information; and
    an estimated signal generator configured to generate the estimated signal based on the filter coefficient.

4. The interference cancellation repeater of claim 3, wherein
    the interference signal existence interval information includes information about a time interval or a frequency interval in which the interference signal exists in the input signal.

5. The interference cancellation repeater of claim 4, wherein
    the filter controller is configured to control the filter coefficient so as to generate the estimated signal in an interval in which the interference signal exists.

6. The interference cancellation repeater of claim 5, wherein the at least one memory and the at least one processor further implement:
    a delay unit configured to delay an input of the output signal to the adaptive filter until the filter coefficient is generated when the filter controller controls the filter coefficient to generate the estimated signal.

7. The interference cancellation repeater of claim 4, wherein
    the filter controller is configured to control the filter coefficient so as not to generate the estimated signal in an interval in which the interference signal does not exist.

8. The interference cancellation repeater of claim 1, wherein
    the estimated signal is a signal estimated to correspond to the interference signal included in the input signal.

9. An interference cancellation repeater configured to cancel an interference signal included in an input signal, the interference cancellation repeater comprising at least one memory and at least one processor to implement:
    a canceller configured to generate an interference canceled signal based on the input signal and an estimated signal;
    a digital filter configured to filter the interference canceled signal to generate an output signal;
    an interference signal detector configured to detect an interval in which the interference signal exists in the input signal based on the input signal and the output signal; and
    an adaptive filter configured to generate the estimated signal based on the interference canceled signal and the output signal in the detected interval.

10. The interference cancellation repeater of claim 9, wherein
    the interference signal detector is configured to calculate a correlation between the input signal and the output signal, and detect a time interval or a frequency interval in which the interference signal exists in the input signal according to the calculated correlation.

11. The interference cancellation repeater of claim 9, wherein
    the adaptive filter is configured to not generate the estimated signal in an interval in which the interference signal does not exist in the input signal.

* * * * *